US012314455B2

(12) United States Patent
Yan et al.

(10) Patent No.: US 12,314,455 B2
(45) Date of Patent: May 27, 2025

(54) VIRTUAL ONE-TIME PROGRAMMING (OTP) TO AVOID DEAD CHIP DURING OTP DEVICE PROGRAMMING (71) Applicant: Fortinet, Inc., Sunnyvale, CA (US)

(72) Inventors: Dengxue Yan, San Jose, CA (US); Zengli Duan, Monte Sereno, CA (US)

(73) Assignee: Fortinet, Inc., Sunnyvale, CA (US)

( * ) Notice: Subject to any disclaimer, the term of this patent is extended or adjusted under 35 U.S.C. 154(b) by 521 days.

(21) Appl. No.: 17/710,593

(22) Filed: Mar. 31, 2022

(65) Prior Publication Data

US 2023/0315919 A1 Oct. 5, 2023

(51) Int. Cl.
*G06F 21/79* (2013.01)
*G06F 21/57* (2013.01)
*G06F 21/60* (2013.01)
*G06F 21/72* (2013.01)
*H04L 45/02* (2022.01)
*H04L 67/1008* (2022.01)

(52) U.S. Cl.
CPC ............ *G06F 21/79* (2013.01); *G06F 21/575* (2013.01); *G06F 21/602* (2013.01); *G06F 21/72* (2013.01); *H04L 45/02* (2013.01); *H04L 67/1008* (2013.01)

(58) Field of Classification Search
CPC ...... G06F 21/79; G06F 21/575; G06F 21/602; G06F 21/72; H04L 45/02; H04L 67/1008
See application file for complete search history.

(56) References Cited

U.S. PATENT DOCUMENTS

| 11,528,219 | B2* | 12/2022 | Rolando | H04L 41/5054 |
| 2004/0268357 | A1* | 12/2004 | Joy | H04L 67/63 718/105 |
| 2015/0046717 | A1* | 2/2015 | Hagiwara | G06F 21/575 713/187 |
| 2015/0067313 | A1* | 3/2015 | Zaidi | G06F 21/572 713/2 |
| 2016/0119819 | A1* | 4/2016 | Ardeli | H04W 36/08 370/331 |
| 2016/0294866 | A1* | 10/2016 | Mihelich | H04L 67/1027 |
| 2018/0176153 | A1* | 6/2018 | Reumann | H04L 49/25 |
| 2019/0214102 | A1* | 7/2019 | Park | G06F 21/79 |
| 2022/0382872 | A1* | 12/2022 | Sakib | G06F 21/85 |

* cited by examiner

*Primary Examiner* — Ayoub Alata
(74) *Attorney, Agent, or Firm* — Law Office of Dorian Cartwright; Dorian Cartwright (57) ABSTRACT Responsive to OTP device not being enabled for an SoC, the RAMBOOT bootup authenticated by the key or key hash of an OTP is precluded and a determination is made whether the RAMBOOT bootup has been authenticated by the key or key hash on the virtual OTP. Responsive to not being authenticated, authentication of the RAMBOOT bootup is initiated. Responsive to being authenticated, enablement of the OTP device is initiated by burning an enable bit. Content of the virtual OTP is verified. The verified content can then be transferred from the virtual OTP to the OTP hardware module. Finally, authenticated RAMBOOT bootup is enabled from the OTP hardware module using the verified content prior to enablement of the OTP hardware module. ROMBOOT is read-only.

11 Claims, 6 Drawing Sheets

VIRTUAL ONE-TIME PROGRAMMING (OTP) TO AVOID DEAD CHIP DURING OTP DEVICE PROGRAMMING

FIELD OF THE INVENTION

The invention relates generally to computer networking, and more specifically, for verifying and authenticating a RAMBOOT on a virtual one-time programmable (OTP) device prior to enabling the OTP hardware module for RAMBOOT boot up before permanent installation on the OTP device.

BACKGROUND

An OTP hardware memory is often integrated into a system on a chip (SoC) semiconductor product. An advantage of OTP memory over reprogrammable memory, such as flash memory, are smaller area and no additional wafer processing steps on the SoC. OTP thus has replaced multitime programmable memory in many low-cost applications.

For security applications, OTP is preferred because it cannot be hacked using passing, semi-invasive and invasive measures. Chips that need encryption keys or other unique identifiers, need to be individually programmed by storing in OTP during chip manufacturing or afterwards.

One problem with OTP arises during programming, when errors arise. For example, when only part of content of an OTP block is programmed due to errors during the programming process, like accidental power loss, a dead chip result.

Therefore, what is needed is a robust technique for verifying and authenticating a RAMBOOT by the key or key hash stored on a virtual OTP prior to enabling the OTP hardware module for RAMBOOT boot up.

SUMMARY

These shortcomings are addressed by the present disclosure of methods, computer program products, and systems for verifying and authenticating a RAMBOOT boot up by the key or key hash stored on a virtual OTP prior to enabling the OTP hardware module for RAMBOOT boot up.

In one embodiment, a determination is made whether the key or key hash on the OTP device has been enabled. Responsive to not being enabled, the RAMBOOT bootup authenticated by the key on an OTP is precluded and a determination is made whether the RAMBOOT bootup has been authenticated by the key on the virtual OTP. Responsive to not being authenticated, authentication of the RAMBOOT bootup is initiated. Responsive to being authenticated, enablement of the OTP device is initiated by burning an enable bit. ROMBOOT is read-only.

In another embodiment, content of the virtual OTP is verified. The verified content can then be transferred from the virtual OTP to the OTP hardware module. Finally, authenticated RAMBOOT bootup is enabled from the OTP hardware module using the verified content prior to enablement of the OTP hardware module.

In still another embodiment, keys are extracted from certificates for storage in flash and a key hash is calculated from the extracted keys for programming into the virtual OTP for authenticating the RAMBOOT boot up prior to authenticated RAMBOOT boot up.

Advantageously, semiconductor manufacturing processes are improved by reducing dead chips. Additionally, computer device performance is improved with smaller processors.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for verifying and authenticating a RAMBOOT by the key or key hash stored on a virtual OTP prior to enabling the OTP hardware module for RAMBOOT boot up.

One of ordinary skill in the art will recognize many additional variations made possible by the succinct description of techniques below.

I. Systems for Virtual OTP Verification (FIGS. 1-2)

Figure 1:
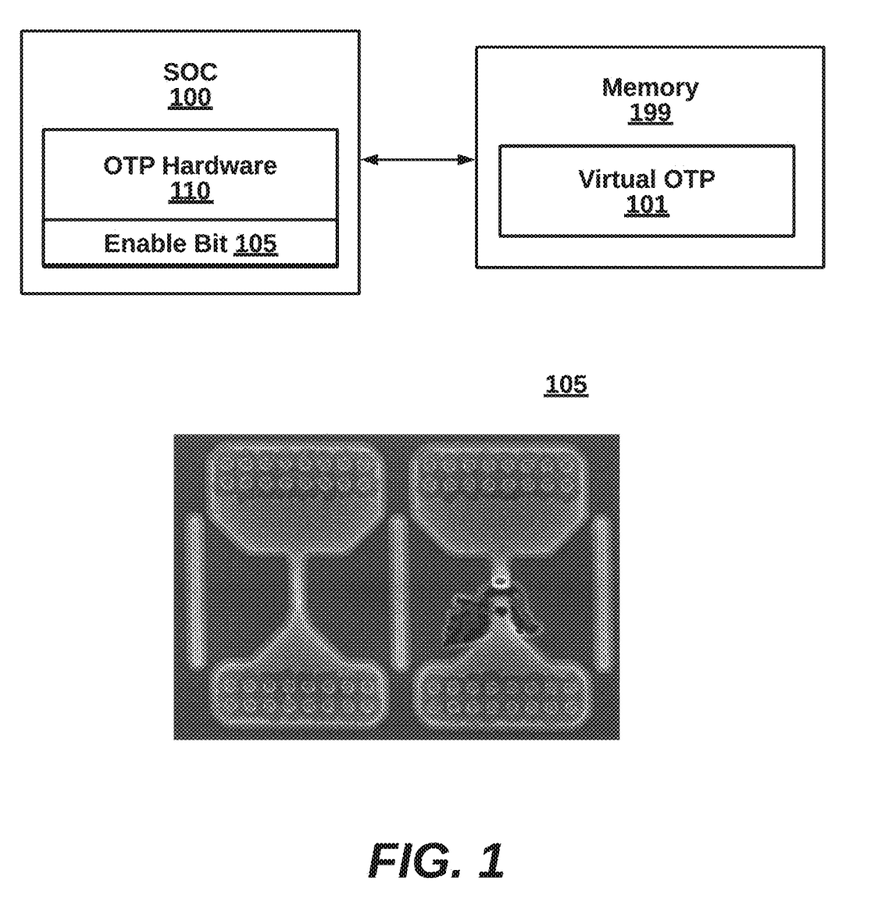
FIG. 1 is a block diagram illustrating a system for verifying and authenticating a RAMBOOT on a virtual OTP prior to enabling the OTP hardware module for RAMBOOT boot up, according to an embodiment.
Figure 2:
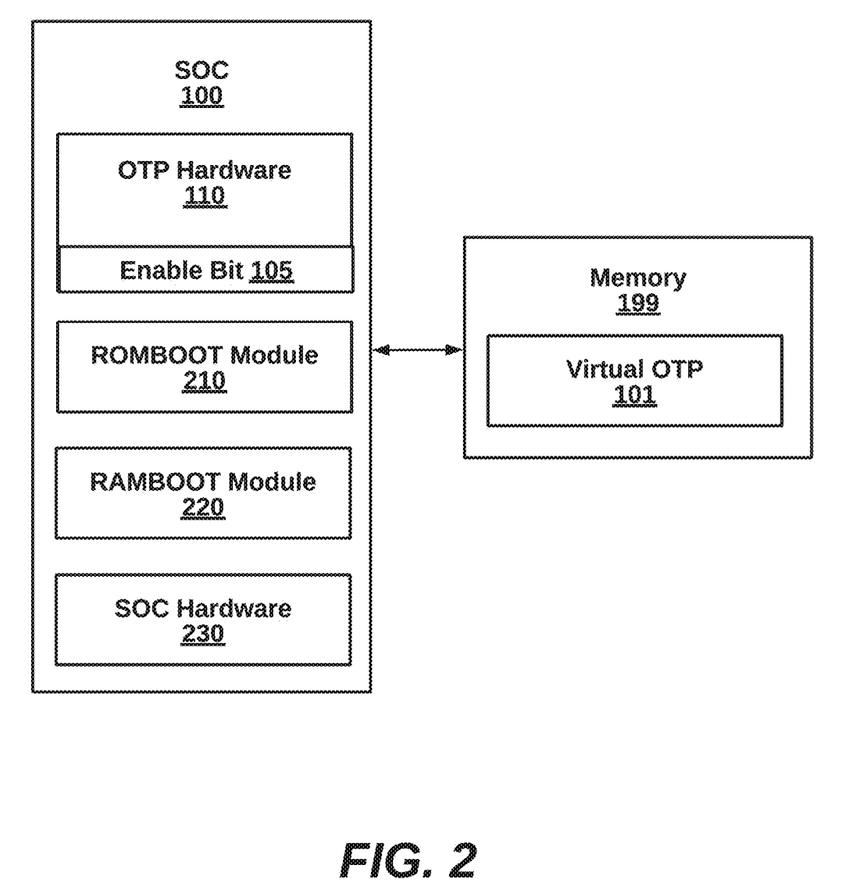
FIG. 2 is a more detailed block diagram illustrating the system of FIG. 1, according to an embodiment.

FIG. 1 is a block diagram illustrating an SOC 100 for verifying and authenticating a RAMBOOT by the key or key hash stored on a virtual OTP prior to enabling the OTP hardware module for RAMBOOT boot up, according to an embodiment. The system includes an SOC 100 and an off-chip memory 199. In other embodiments, memory is on-chip as part of the SOC 100 by integration, or memory on the same motherboard as the SOC 100.

In one embodiment, based on whether or not the enable bit 105 of the OTP hardware 110 has been burned, boot up is sourced from the virtual OTP 101 of the off-chip memory 199 or the on-chip OTP hardware 110. The enable bit 105 is burned once the virtual OTP content is verified in order to activate the OTP hardware 110 as shown in enable bit 106A versus enable bit 106B. One implementation of the enable bit 105 has a lower resistance than standard, such as 50-100 Ohm to allow burn through. Some implementations have multiple enable bits. The enable bit 105 can be triggered by a differential voltage sensor. The memory 199 can comprise a USB (or UART) drive plugged into a USB port that is communicatively connected to the SOC 100. In other embodiments, the off-chip memory 199 comprises SPI flash, eMMC, SD, RAM, and the like.

The SoC 100 can generate or receive content for programming into the virtual OTP 101 and eventually the hardware OTP 110. Circuitry and code changes can be made during initial programming at manufacturing or made during updated programming afterward manufacturing through the enable bit 105. A boot up procedure on the SOC 100 uses the virtual OTP 101 to verify/authenticate the content. Authenticated content is programmed into the OTP hardware 110 on chip by copying the source code. The enable bit 105 is burned to irreversibly activate updates such that boot up subsequently occurs through the OTP hardware 110.

The content can be source code for lower-level drivers and boot up code (e.g., BIOS) to prepare hardware (e.g., RAM), an operating system, or higher-level applications. Source code can be downloaded from an online resource to the memory 101 in real time or be preconfigured. One example of the content is boot up code, a bootloader, a boot manager, or bootstrap loader, that is run by a processor once voltages have been stabilized and hardware is readied for an operating system. The enable bit 105 being in place causes boot up code to be accessed from a predetermined address, while the enable bit 105 being burned causes boot up code to be accessed from a different predetermined address. Boot up brings a computing device incorporating the SoC 100 up and ready for use. Boot up can also fail, such as when key image of the OTP hardware 130 there is any change in content, size, or location of the key image.

The SoC 100 has many different uses, such as a security chip providing a firewall in network device hardware or IPsec VPN (Internet Protocol security Virtual Private Network). Generally, an SoC is an integrated circuit that integrates all or most components of a computer system. The SOC 100 can be a semiconductor device used to operate a network device, a computer, a smartphone, an airplane, as non-limiting examples. After design, the SOC 100 can be etched into a silicon substrate, and then deployed.

FIG. 2 is a more detailed block diagram illustrating the components of the system 100 of FIG. 1, according to an embodiment. Besides the OTP hardware 130, the SoC 100 further comprises a ROMBOOT module 210, RAMBOOT module 220, and SoC hardware 230.

The OTP hardware 110, in one example, is a type of non-volatile memory that comprises of electrical fuse (eFuse) or antifuse. One or more arrays can be arranged using differential paired eFuse cells with single or dual ports with 0.18 micron CMOS technology or the like. Besides cell arrays, a control logic, a column decoder, and a program data driver circuit also add to the operation. An amount of storage is implementation-specific, for example, between 8 bits, 512 bits and 4 kbits.

The ROMBOOT module 210 determines whether the OTP device that is used to authenticate RAMBOOT bootup has been enabled in the OTP hardware 130 for standard booting. Responsive to not being enabled, the ROMBOOT module 210 precludes OTP hardware boot up in favor of the virtual OTP boot up. The ROMBOOT module 210 next determines whether the RAMBOOT bootup is authenticated by the key or key hash stored in the virtual. Responsive to not being authenticated, authentication of the RAMBOOT bootup is initiated, and responsive to being authenticated, enablement of the OTP device is initiated. The ROMBOOT module is read-only.

The RAMBOOT module 220, for unauthenticated RAMBOOT boot up, checks a certificate for validity. Keys are extracted from the certificate and a key image is formed. The key image is programed into storage for recognition by ROMBOOT. A key image hash is calculated and programmed into the virtual OTP. The system will then automatically reboot.

The RAMBOOT module 220, once the RAMBOOT boot up has been authenticated and the system rebooted, copies source code and compares after copying for accuracy. If the content does not match, the RAMBOOT module 220 will retry or notify a user and wait for user commands. For verified matching content, the system will enable the OTP hardware 130. To do so, a low resistance metal in eFuse is blown by electro-migration because the high-density current flows through a narrow metal or poly (e.g., a bone layout). When using high-k metal gate CMOS logic process, there is no polysilicon layer to be used as eFuse, and metal traces can be used. The system will then automatically reboot again.

The SoC hardware 130 comprises additional chip components necessary for implementation on the common die. One or more processors or controllers is needed to coordinate the SoC 100, and memory is needed on chip. Depending on the specifications, wireless transceivers, power management modules, busses and other components can be included within the single die.

II. Methods for Virtual OTP Verification (FIGS. 3-5)

Figure 3:
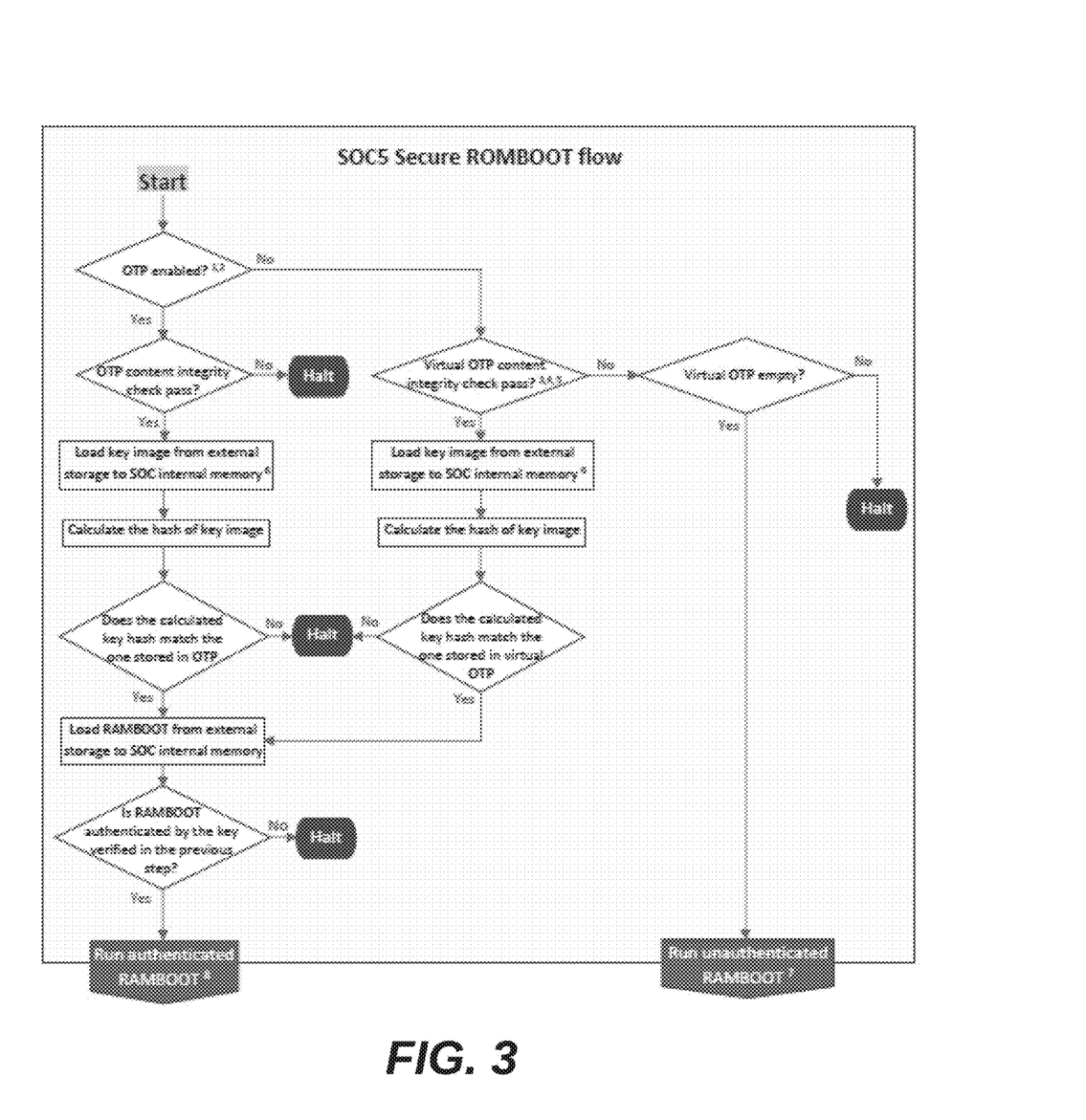
FIG. 3 is a high-level flow diagram illustrating a method for verifying and authenticating a RAMBOOT by the key or key hash stored on a virtual OTP prior to enabling the OTP hardware module for RAMBOOT boot up, according to an embodiment.

FIG. 3 is a high-level flow diagram illustrating a method 300 for verifying and authenticating a RAMBOOT by the key or key hash on a virtual OTP prior to enabling the OTP hardware module for RAMBOOT boot, according to one preferred embodiment. The method 300 can be implemented, for example, by the ROMBOOT module 210 of SoC 100 or another write once then read-only device. The steps are merely representative groupings of functionality, as there can be more or fewer steps, and the steps can be performed in different orders. Many other variations of the method 300 are possible.

At step 310, it is determined whether the content on OTP device has been enabled, and responsive to not being enabled, normal RAMBOOT bootup is precluded for the on-chip OTP hardware. At step 320, it is determined whether the RAMBOOT boot up has been authenticated. Responsive to not being authenticated, at step 330, authentication of the RAMBOOT bootup is initiated. At step 325, a key is generated and stored for subsequent authentications. Responsive to being authenticated, at step 315, enablement of the RAMBOOT boot up authenticated from on chip OTP hardware is initiated. Responsive to the OTP device being enabled, at step 315, RAMBOOT boot up authenticated from the on-chip OTP is initiated.

Figure 4:
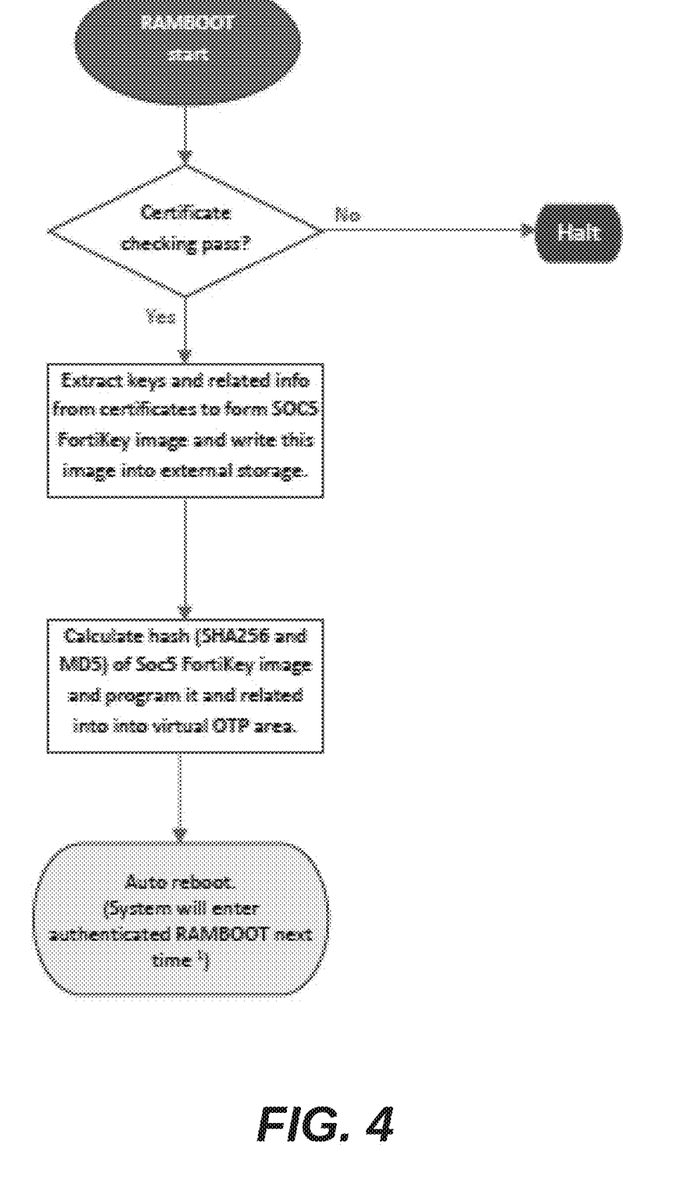
FIG. 4 is a high-level flow diagram illustrating a method for enabling the key or key hash on the OTP device for RAMBOOT boot up, according to one preferred embodiment.
Figure 5:
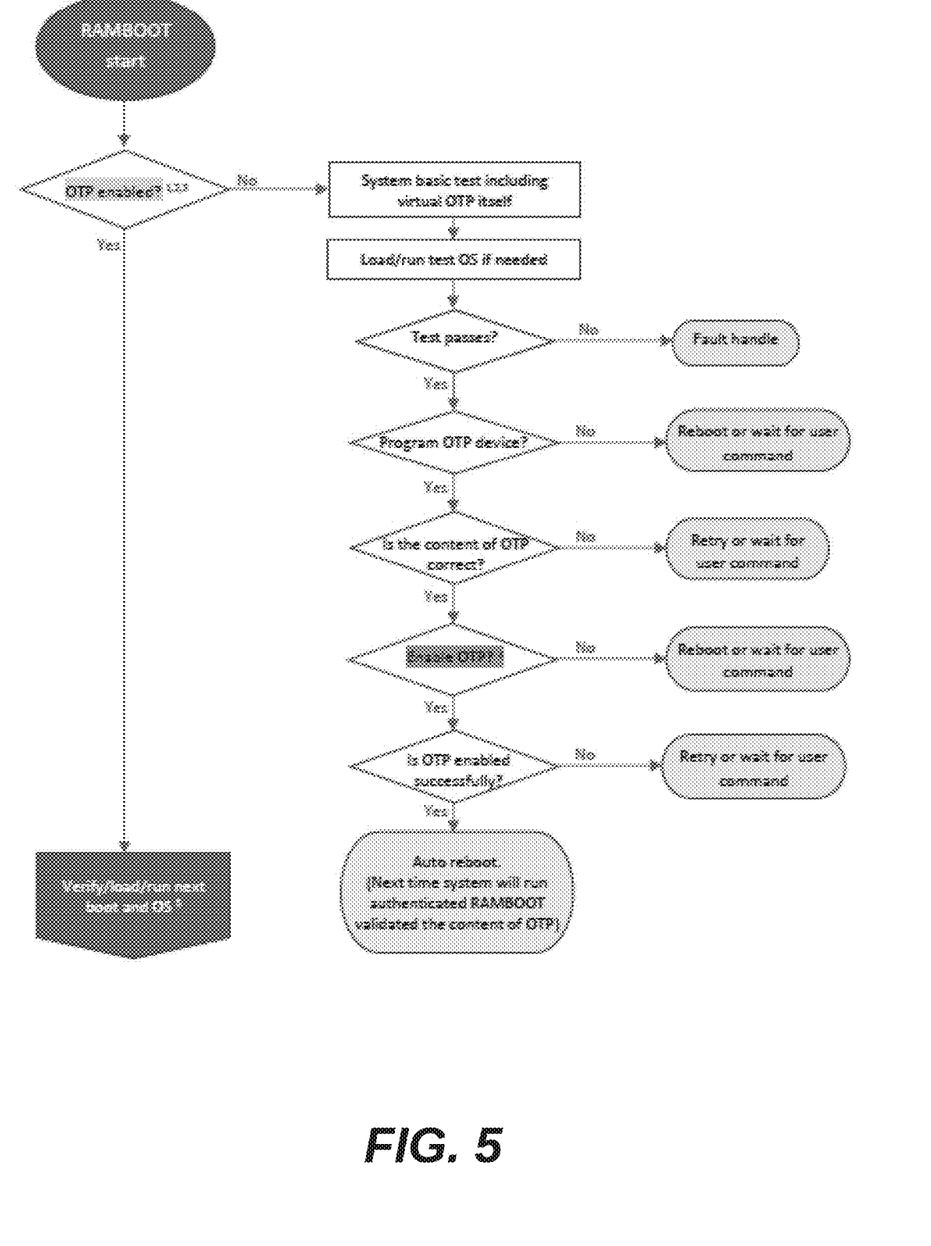
FIG. 5 is a more detailed flow diagram illustrating a step of authenticating an unauthenticated RAMBOOT boot up, according to one embodiment.

FIG. 4 shows further details concerning enablement of OTP hardware boot up step 325. More specifically, at step 410, a certificate is checked for validity. At step 420, keys extracted are from the certificate for storage in flash. At step 430, a key hash is then calculated from the extracted keys for programming into the virtual OTP for authenticating the virtual RAMBOOT boot up prior to authenticated virtual RAMBOOT bootup. Auto-reboot occurs at step 440.

FIG. 5 shows further details about step 315. At step 510, content is transferred from the virtual OTP to the OTP hardware module. At step 520, content of the OTP hardware is verified as being correctly copied and further programmed. At step 530, RAMBOOT bootup is enabled from the OTP hardware module by burning an enablement fuse. Auto-reboot occurs at step 540.

III. Generic Computing Environment (FIG. 6)

Figure 6:
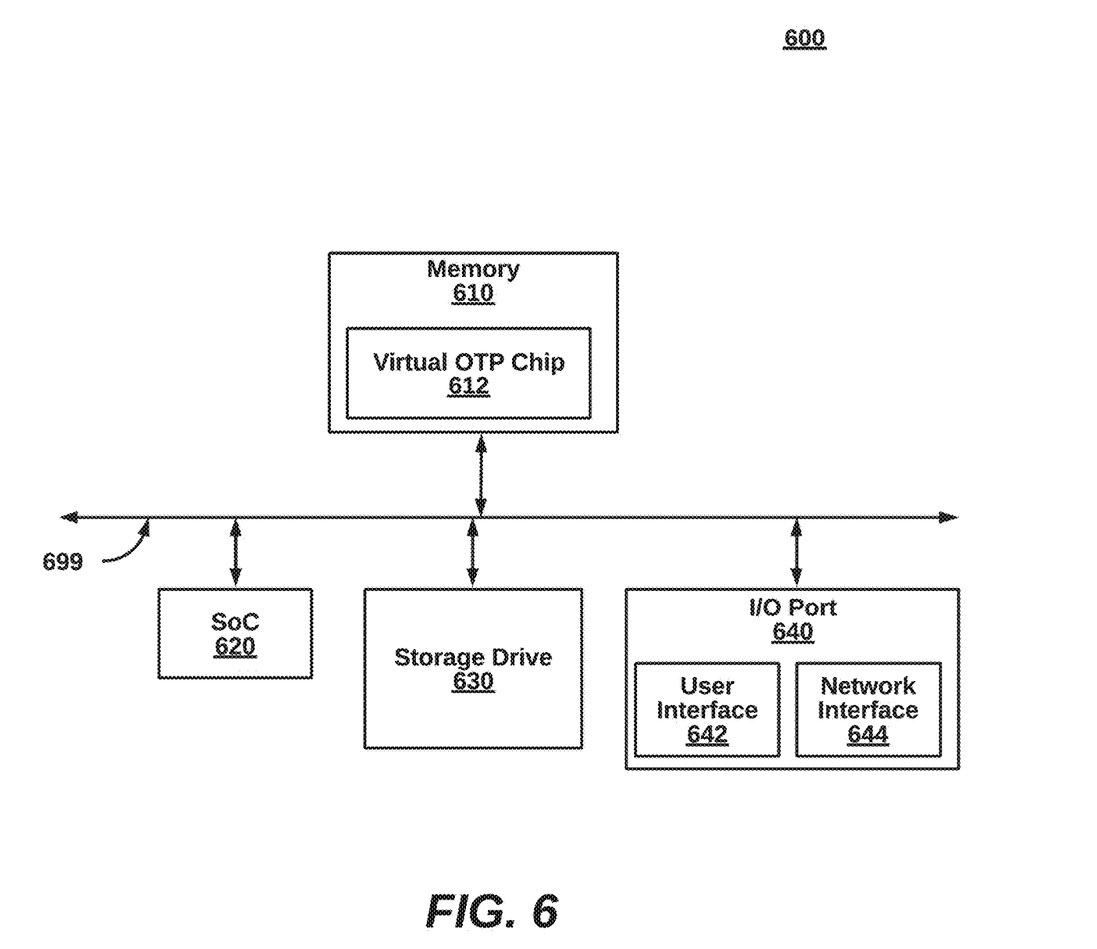
FIG. 6 is a high-level block diagram illustrating a computing device as an example hardware implementation of the SOC herein, according to an embodiment.

FIG. 6 is a block diagram illustrating a computing device 600 capable of implementing components of the system, according to an embodiment. The computing device 600 of the present embodiment, includes a memory 610 with a virtual OTP 612, an SoC 620, a storage drive 630, and an I/O port 640. Each of the components is coupled for electronic communication via a bus 699. Communication can be digital and/or analog and use any suitable protocol. The computing device 600 can be any of components of the system 100, other networking devices (e.g., an access point, a firewall device, a gateway, a router, or a wireless station), or a disconnected device. The example of FIG. 6 is non-limiting as many other example computing devices can be implemented herein.

The memory 610 can store network browsers, daemons communicating with other network devices, network protocol software, and the like. A virtual OTP 612 can execute from the computing device 600, in some off-chip embodiments. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The SoC 620 includes one or more hardware OTPs.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPsec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An SOC having an on-die one-time programmable (OTP) hardware module, for authenticating random access memory boot (RAMboot) on a storage prior to enabling the OTP hardware module for read only memory boot (ROMboot) boot up, a system on a chip (SOC) comprising:

a substrate for the SOC;
a virtual OTP module stored on an external memory;
the OTP hardware module comprising a ROM memory that can only be programmed once;
a ROMboot module, that is read-only, to:
determine whether the OTP hardware module has been enabled, and responsive to not being enabled, precluding bootup by content of the OTP module and switching to the virtual OTP module, and determine whether the RAMboot bootup of the virtual OTP module has been authenticated, and responsive to not being authenticated, initiating authentication of the RAMboot bootup;
a RAMboot module to authenticate the RAMboot bootup by verifying content of the RAMboot bootup on the virtual OTP module, to transfer verified content from the virtual OTP module to the OTP hardware module, and to enable the OTP hardware module for use in future bootups, wherein enablement of the OTP hardware module is not reversible and content cannot be updated after enablement; and
wherein the ROMboot module verifies the RAMboot content by extracting a key from certificates for the RAMboot content from the virtual OTP module and calculates a key hash from the extracted keys for comparison against a key hash stored on the virtual OTP module during a previous bootup.

2. The SOC of claim 1, wherein, responsive to the OTP hardware module being enabled, continuing to bootup using the content from the OTP hardware module.

3. The SOC of claim 1, wherein, responsive to the RAMboot bootup being authenticated, enabling the OTP hardware module.

4. The SOC of claim 1, wherein an enable bit is physically burned to irreversibly activate the OTP hardware module.

5. The SOC of claim 1, wherein the content comprises at least one or drivers, bootloader and bootup code.

6. The SOC of claim 1, wherein the SOC is a component of a computing device.

7. The SOC of claim 1, wherein authentication of the RAMboot fails due to a change in size or location.

8. The SOC of claim 1, wherein a key image is stored to an external memory during a previous bootup attempt.

9. The SOC of claim 1, further comprising extracting one or more keys from a certificate to form a key image and storing the key image to an external memory.

10. The SOC of claim 1, further comprising calculating a hash of a key image and storing the hash in the virtual OTP.

11. The SOC of claim 1, wherein the external memory comprises a flash memory device.

* * * * *